D. M. PETTY.
LIQUID RHEOSTAT.
APPLICATION FILED JUNE 23, 1921.
1,433,646.
Patented Oct. 31, 1922.
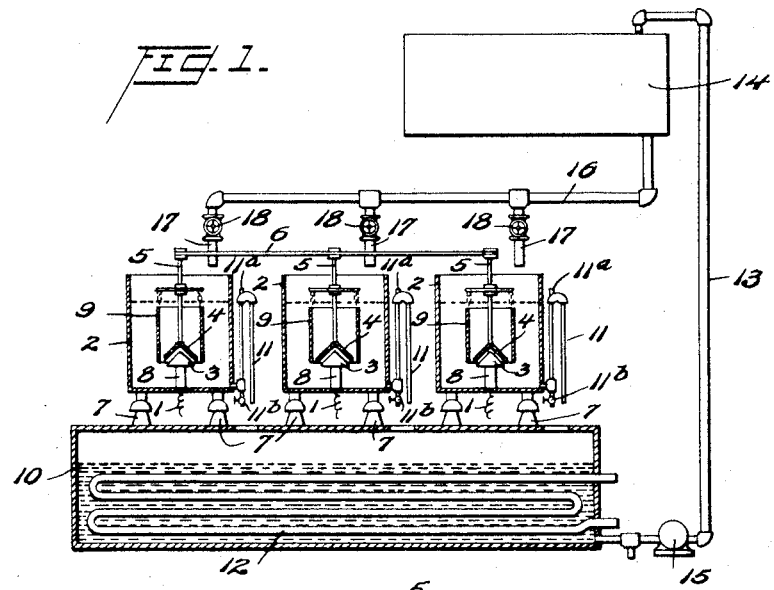
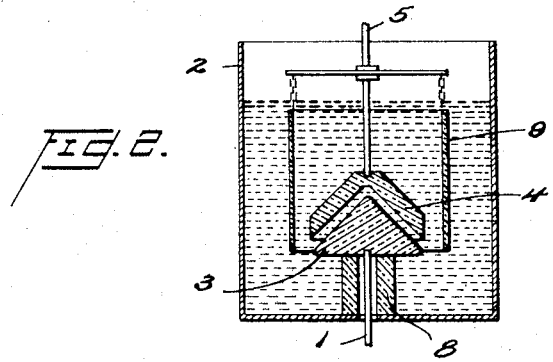
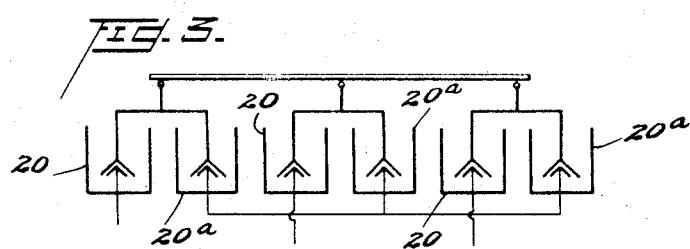
Inventor
David M. Petty
By Watson, Coit, Morse and Grindle
Att'ys Patented Oct. 31, 1922.

1,433,646

UNITED STATES PATENT OFFICE.

DAVID MILTON PETTY, OF BETHLEHEM, PENNSYLVANIA.

LIQUID RHEOSTAT.

Continuation of application Serial No. 398,367, filed July 23, 1920. This application filed June 23, 1921.
Serial No. 479,908.

*To all whom it may concern:*

Be it known that I, DAVID MILTON PETTY, a citizen of the United States, and residing at Bethlehem, Lehigh County, State of Pennsylvinia, have invented certain new and useful Improvements in Liquid Rheostats, of which the following is a specification.

This invention relates to liquid rheostats and particularly to devices of that kind in which a cooling system for the electrolyte is employed.

The general object of the invention is to provide a liquid rheostat which is simple in construction and operation and which will function in a reliable and effective manner. These results are attained by providing an improved construction in which the use of fragile insulating material is largely avoided and in which the parts are so arranged as to facilitate prompt renewal of the electrodes and rheostat tanks; by providing a construction which permits the use of a relatively small amount of liquid in the rheostat tanks proper and in which an effective cooling system, insulated from the rheostat tanks proper, is employed, and by providing certain other novel features hereinafter pointed out and embraced in the appended claims.

The invention will be described in its application to a liquid rheostat which is particularly adapted for use in the regulation of a large three-phase induction motor of the slip-ring type, but it is to be understood that the invention is not limited to use in the particular relation mentioned.

The invention is set forth in the accompanying specification and defined in the appended claims and one embodiment thereof is illustrated in the accompanying drawings in which:

Fig. 1 is a view partly diagrammatic and partly in section showing the general arrangement of a system embodying the invention;

Fig. 2 is a cross sectional view through one of the rheostat tanks proper; and

Fig. 3 is a diagrammatic view illustrating a rheostat system designed for obtaining effective cooling of the electrolyte and to which system the various details of construction illustrated in Figures 1 and 2 are applicable.

Referring to the drawings in detail the numerals 1 represent the three conductors which lead from the slip ring of a motor (not shown) to which the device is intended to be applied. These conductors pass through the bottom of the rheostat tanks 2 and are connected electrically to the stationary electrodes 3. The movable electrodes 4 are mounted on suitable supporting members 5 which are connected together by means of the member 6 which may constitute the neutral of the system. It will be understood that the liquid electrolyte is contained in the tanks 2. One path of the current therefore is obviously from the various conductors 1 to the stationary electrodes 3 through the electrolyte to the movable electrodes 4 and thence to the neutral member 6.

The tanks 2 are made of any suitable nonfragile material, preferably steel, the construction herein set forth permitting the use of a non-insulating material in the tanks. Each of said tanks 2 is mounted on insulators 7 of any desired character, preferably of the out-door type. The stationary electrodes 3 are supported on suitable stands 8 which may be either an insulator, a body of high resistance material, or a conductor.

In cases where the stands are composed of non-insulating material the diameter of the same should be substantially less than the diameter of the base of the stationary electrodes in order to reduce leakage between the moving electrode and the corresponding stand and in any case the distance between the moving electrode and the side and bottom of the corresponding tank should be sufficiently great to prevent serious leakage between such parts.

Where conditions warrant it a curtain 9 made of a high resistance material, such as terra cotta and open at both ends, may be supported so as to surround the moving electrodes and to move therewith as the position of such electrodes is changed. The function of such curtains is to increase the current path between the moving electrodes and the sides of the tanks.

The movement of the moving electrodes may be controlled by any suitable automatic mechanism (not shown) such as a torque motor and provision may also be made for manual adjustment of the same. The purpose of the automatic control of the movable electrodes in devices of this kind and the mode of operation of the means employed for securing such automatic control are well known to those skilled in the art and description and illustration of the same are unnecessary.

In the case of large induction motors the heat developed in each rheostat tank cannot be dissipated effectively by radiation alone or by cooling means installed in the rheostat tanks without making the tanks excessively large. The present invention contemplates an arrangement for overcoming this difficulty. Arranged beneath the rheostat tanks 2 there is a second or reserve tank 10 which is adapted to receive the hot liquid electrolyte which overflows from the tanks 2. Each of said tanks 2 has connected therewith a U-shaped outlet pipe 11, one end of which communicates with said tanks at or near the bottom thereof and the other end of which is arranged above the tank 10. The upper portion of said pipes are each provided with a vent 11$^a$, open to the air, and below their connection with the tanks 2 each is provided with a valve 11$^b$, through which the tanks may be drained when desired. The hot electrolyte flows from the tanks 2 through the outlet pipes 11 and into the second tank 10 where it is cooled by means of a cooling coil 12 arranged in the tank 10 and through which water or any other suitable cooling medium may be circulated. The cooled electrolyte is returned to the tanks 2 in the following manner. A pipe 13 is connected to the reserve tank 10 and is arranged to convey the electrolyte from the last named tank to an elevated tank 14 arranged above the rheostat tanks 2. A pump 15 is employed for elevating the electrolyte from the tank 10 and discharging the same into the said elevated tank 14. A pipe 16 communicates with the lower part of the elevated tank 14 and above each of the rheostat tanks 2 there is arranged a short branch pipe or nozzle 17 which communicates with said pipe 16. Each of said nozzles is provided with a valve 18 by which the flow of liquid therethrough may be regulated.

One of the main features of the invention consists in maintaining substantial insulation between the liquid in the rheostat tanks proper and the cooling system while liquid is being transferred from said tanks to said system and vice versa. This result is accomplished in the following manner. The outlets of the pipes 11 are arranged a considerable distance above the normal level of the liquid in the reserve tank 10 and the lower ends of the nozzles 17 are likewise arranged a considerable distance above the normal level of the liquid in the rheostat tanks 2, with the result that the liquid passes into and out of each rheostat tank in a comparatively small stream which is caused to drop by gravity through the air. In each case the distance through which the liquid falls is preferably sufficiently great to cause it to be broken up into separated portions or discontinuous streams due to the height of the fall. It has been found, however, that substantial insulation can be maintained even where the height of fall of the liquid is not sufficient to cause perceptible breaking up of the falling streams. Instead of the arrangement shown in the drawing, the liquid may be caused to flow over baffles or other equivalent arrangements, in passing into and out of the rheostat tanks. This feature of transferring the liquid from and to the rheostat tanks while maintaining substantial insulation between such tanks and the cooling system, is an important feature of the invention and one which it is desired to broadly protect.

In Figure 3 of the drawing there is illustrated diagrammatically a novel means of securing an increase in resistance and at the same time an increase in the radiating surface of a rheostat electrolyte, this result being accomplished by dividing the total resistance required into two portions, connecting up these portions in series and placing each portion in separate tanks such as 20, 20$^a$. By this means it is apparent that two or more relatively small tanks may be substituted for one large tank and at the same time the radiating surface per unit of volume of the electrolyte is materially increased. In this case also automatically or manually controlled means may be employed for simultaneously adjusting the moving electrodes in one phase or in all the phases as required, and it is also to be understood that the various features of the cooling system, as well as other features heretofore described, may be embodied in a system such as that illustrated in said Figure 3.

This application is a continuation of my prior allowed application Serial No. 398,367, July 23, 1920, and is filed as a substitute for said prior application.

Having thus described the invention what is claimed as new and desired to be secured by Letters Patent is:

1. The combination of a liquid rheostat and a cooling system, the tank of said rheostat being normally insulated from the ground and parts of the electrolyte in the cooling system being normally grounded, means for transferring the electrolyte from the rheostat tank to the cooling system and vice versa, said transfer being effected while maintaining substantial insulation between the electrolyte in the rheostat and the ground.

2. The combination of a liquid rheostat and a cooling system therefor, the tank of said rheostat being composed of non-insulating material but normally insulated from the ground, said cooling system being normally grounded, and means for transferring the electrolyte from the rheostat tank to the cooling system and vice versa, said transfer being effected while maintaining substantial insulation between the rheostat electrolyte and the electrolyte in the cooling system.

3. The combination of a liquid rheostat and a cooling system therefor, the capacity of said rheostat being relatively small compared with the capacity of the cooling system and means for insulating the electrolyte in the rheostat from the electrolyte in the cooling system.

4. A construction of the kind described comprising a rheostat tank adapted to contain a liquid, said tank having an outlet for the escape of liquid therefrom, a second tank arranged to receive the liquid falling from the outlet of said first tank, said outlet being sufficiently elevated above the liquid level in the second tank to cause breaking up of the falling liquid into a discontinuous stream as it falls into the second tank, and means for returning the liquid from the second tank to the first tank.

5. A construction of the kind described comprising a rheostat tank having an outlet for the escape of liquid therefrom, a second tank arranged beneath said outlet and adapted to receive liquid escaping therefrom, said outlet being spaced above the liquid level of said second tank sufficiently to cause breaking up of the liquid into discontinuous streams as it falls into the second tank, a nozzle arranged above the first tank sufficiently elevated above the normal liquid level thereof to cause liquid flowing from the nozzle into the tank to be broken up into a discontinuous stream and means for transferring the liquid from said second tank to said nozzle.

6. A construction of the kind described comprising a rheostat tank adapted to contain a liquid and having an outlet for the escape of liquid therefrom, a second tank arranged beneath said rheostat tank to receive the liquid flowing from said outlet, said outlet being arranged above said second tank a sufficient distance to cause the liquid falling therefrom to be broken up into a discontinuous stream, an elevated tank arranged above said rheostat tank, means for transferring the liquid from said second tank to said elevated tank, a nozzle arranged above said rheostat tank, means for conveying liquid from said elevated tank to said nozzle, said nozzle being arranged above said rheostate tank a sufficient distance to cause liquid falling therefrom to be broken up into a discontinuous stream.

7. The method of operating rheostats which consists in immersing electrodes in a liquid electrolyte contained in a tank, constantly withdrawing the electrolyte from the tank in a discontinuous stream, cooling said electrolyte and returning the same to said tank.

8. The method of operating rheostats which consists in immersing electrodes in liquid electrolyte contained in a tank, constantly withdrawing the electrolyte from the tank in a discontinuous stream, cooling said electrolyte and returning the same to said tank in a discontinuous stream.

9. In a liquid rheostat, the combination of a tank adapted to contain liquid, an electrolyte, a fixed and movable electrode, and a curtain of high resistance material surrounding said moving electrode and arranged to move therewith.

10. In a liquid rheostat, the combination of a tank composed of non-insulating material, an electrolyte in said tank, a fixed and movable electrode, and a stand of high resistance material upon which said fixed electrode is mounted.

11. A liquid rheostat comprising two separate tanks, a pair of electrodes in each tank, one of the electrodes in each pair being connected to an external circuit and the remaining electrodes being directly connected electrically to each other to form an unshunted path for current flowing between the same.

12. The combination of two liquid rheostat arranged in series, one electrode in one of said rheostats being directly connected electrically to one of the electrodes of the other rheostat to form an unshunted path between said electrodes, the other electrodes of each of said rheostats being connected to an external circuit, and means for simultaneously adjusting the distance between the electrodes in each rheostat.

13. In a liquid rheostat for polyphase motors, a series of tanks each having an electrode connected to the motor, each of said tanks also having a second electrode, a second series of tanks, an electrode in each of said second series of tanks and a common neutral member to which each said last named electrodes is connected, each one of said second series of tanks also having another electrode which is directly connected to one of said second electrodes in one of said first named series of tanks.

14. In a construction of the kind described in combination, a rheostat tank adapted to contain a liquid, a cooling system therefor electrically insulated from said tank, means for transferring liquid from said tank to said cooling system, said means being arranged to cause the liquid to fall by gravity through the air in passing from said tank to the cooling system, and means for returning the cooled liquid to the rheostat tank.

15. In a construction of the kind described in combination, a rheostat tank adapted to contain liquid, a cooling system therefor electrically insulated from said tank, means for transferring liquid from said tank to said cooling system, said means being arranged to cause the liquid to fall by gravity through the air in passing from said tank to the cooling system, means for returning the cooled liquid to said tank, said last named means also being arranged to cause the liquid to fall by gravity through the air on its return to said tank.

16. In a construction of the kind described in combination, a rheostat tank adapted to contain liquid and having an outlet for the liquid, a cooling tank arranged below said rheostat tank and insulated therefrom, said cooling tank being positioned to receive the liquid from said rheostat tank, the outlet from said rheostat tank being arranged above the liquid level in said cooling tank whereby the liquid is caused to fall by gravity in a stream through the air in passing from said rheostat tank to the cooling tank, and means for returning the cooled liquid to the rheostat tank, said last named means also being arranged to cause the liquid to fall by gravity in a stream on its return to said rheostat tank.

In testimony whereof I hereunto affix my signature.

DAVID MILTON PETTY.